United States Patent Office 2,811,547
Patented Oct. 29, 1957

2,811,547
PROCESS FOR PREPARING 5-CHLOROSALICYLIC ACID

Arthur E. Brown, Westfield, N. J., assignor to General Aniline & Film Corporation, New York, N. Y., a corporation of Delaware No Drawing. Application October 27, 1955, Serial No. 543,241

13 Claims. (Cl. 260—521)

This invention relates to a new and improved process for the preparation of 5-chlorosalicyclic acid and, specifically, it relates to a process for the preparation of 5-chlorosalicylic acid in excellent yield and of high degree of purity by the direct chlorination in an organic solvent.

The prior art is replete with procedures for the preparation of 5-chlorosalicylic acid from innumerable starting materials. None of these aforementioned processes, however, combines all of the advantages of the present invention in so far as simplicity and ease of operation, safety of operation, availability and low cost of starting materials, purity of final product, and high yields are concerned.

5-chlorosalicylic acid has been prepared from p-chlorophenol by a modified form of the Reimer-Tiemann synthesis wherein alkaline potassium hydroxide and carbon tetrachloride are employed at 140° C. The reaction is carried out in a sealed tube for 5–6 hours and proceeds in accordance with the following equation:

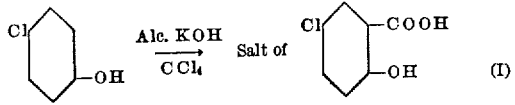

This procedure, however, results in a relatively impure product which, even after several recrystallizations, is still wanting in degree of purity (Hasse, Ber. 10 2190–2, (1877)).

Other similar processes employing aqueous sodium hydroxide and carbon tetrachloride have been reported but extremely low yields result therefrom (Sen & Ray, J. Ind. Chem. Soc. 9 176 (1932).

5-chlorosalicylic acid has been prepared also by the Kolbe synthesis, from sodium p-chlorophenate and carbon dioxide. Again, rather poor yields are obtained by this method (PB 74051 FRAME 240).

5-chlorosalicylic acid has also been obtained by the condensation of p-chlorophenol with methyl acetoacetate or cyclohexanone-2-carboxylic acid to form 6-chloro-2,3-dimethylchromone in the first instance, and 7-chloro-1,2,3,4-tetrahydroxanthone in the second instance. Both these products can be hydrolyzed in an alkaline medium to 5-chlorosalicylic acid. The overall reaction may be depicted as follows:

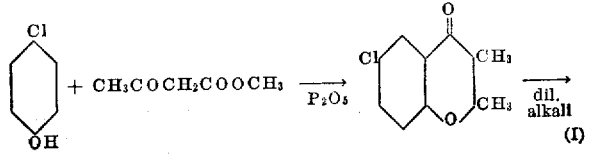

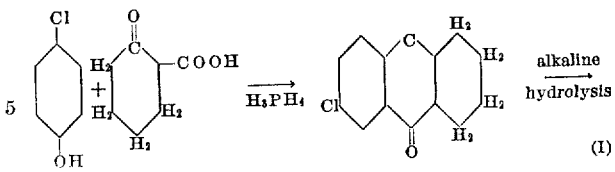

In such processes, again, the yields are quite low and the expensive intermediates make this method economically undesirable and unfeasible. 5-amino-salicylic acid has been diazotized and the resulting product converted to 5-chlorosalicylic acid, by Sandmeyer type reaction employing cuprous chloride (Weil, Fraun & Marcel, Ber. 55, 2664–5 (1922)) or the platinum chloride salt of 5-diazosalicylic acid may be converted to 5-chlorosalicylic acid by heating to 200° C. (Schmitt, Jahresber. über de Fortschr. der Chem. 1864, 385).

Again, such methods are unsatisfactory from the viewpoint of low yields and expense of the intermediates and reagents. Benzoic acid may be converted to 5-chlorosalicylic acid by a complex and long series of reactions involving chlorination, nitration, reduction, diazotization and several purifications, as illustrated by the following equation:

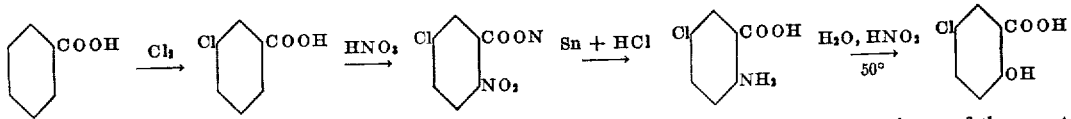

Here, too, the complexity of the reactions, of the great number of steps, and poor overall yields render such a process very undesirable. Various derivatives of 5-chlorosalicylic acid have been treated so as to regenerate the parent compounds. Such techniques are of little value commercially or economically but are of primary interest only for their scientific achievements. Thus, the methyl ether of 5-chlorosalicylic acid in the presence of hydrogen iodide regenerates the parent compound. The ethyl ester may be converted to the parent compound by hydrolysis and potassium hydroxide.

5-chloro-2-hydroxybenzonitrile may be hydrolyzed with sulfuric acid to give 5-chlorosalicylic acid (Biltz & Steph, Ber. 37 4026–7 (1904)).

5-chlorosalicylin (glyceryl ester of 5-chlorosalicylic acid) may be hydrolyzed in the presence of potassium dichromate or potassium permanganate to give the parent compound (Visser, Arch. Pharm. 235, 549–50 (1897)).

5-chlorosalicylamide has been condensed with chloral and then hydrolyzed with 10% sodium hydroxide to give 5-chlorosalicylic acid (Hirwe & Rana, Ber. 72, 1351–2 (1939)) as illustrated by the following equation:

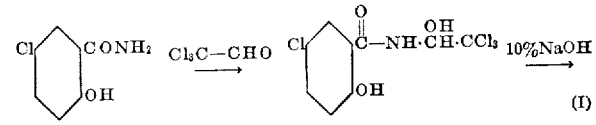

Bis-(3-carboxy-4-hydroxyphenyl) sulfide has been treated with sulfuryl chloride in dry benzene to produce 5-chlorosalicylic acid.

2-hydroxy-5-chloroacetophenon has been condensed with ethyl acetate to form a β-diketone which can be cleaved to yield 5-chlorosalicylic acid (Wittig, Ber. 57, 88 (1924)).

6-chloro-2,3-diphenylchromone has been degraded with 40% potassium hydroxide to yield 5-chlorosalicylic acid, among other products, and it has also been reported that aureomycin may be degraded with aqueous sodium hydroxide in an inert atmosphere to give an insignificant yield of 5-chlorosalicylic acid (Kuhn & Dury, Ber. 84, 563–5) (1951)).

It is at once obvious that such procedures are more in the nature of laboratory curiosities than as commercially feasible procedures for the preparation of the desired 5-chlorosalicylic acid. The most obvious approach to the successful preparation of this compound is by the direct chlorination of salicylic acid itself. Such techniques are numerous in the prior art but, again, none has achieved the combination of advantages outlined above for the process of this invention. Among the direct chlorination procedures are the following:

The chlorination of salicylic acid in an ethanol medium as reported in J. A. C. S. 1, 176–81 (1879/80), Ber. 13, 34–6 (1880) produces mixtures of 5-chlorosalicylic acid and 3,5-dichlorosalicylic acid. The use of methanol has been reported (C. A. 25, 1504 (1931)) as producing only the one isomer 5-chlorosalicylic acid, but the flammability and toxicity of this solvent makes its use undesirable. In addition, the yields are wanting.

Cold glacial acetic acid has been employed as a solvent (C. A. 33, 2124 (1939)) but the resulting yields are quite low and the danger attendant with the use of this solvent is quite obvious.

Carbon disulfide has been reported as a solvent in such processes, but yields of only 65% have been reported (Anschutz & Anspach, Ann. 346, 318–21 (1906)) and, of course, the extreme danger associated with the use of this solvent renders its use very objectionable.

The use of suspensions of salicylic acid in a liquid medium along with the use of chlorine gas as a chlorinating agent is also known. A chlorobenzene suspension has been employed (PB 70254 frame 7008) but the impurity of the resultant 5-chlorosalicylic acid attendant with the necessity for the use of high pressures and very slow reaction time (26–31 hours) renders this process economically unfeasible.

Aqueous alkaline reaction mediums have been employed; Cahours, Ann. Chim. (3) 13, 108–111 (1845), used the potassium salt of salicylic acid and found the product difficult to purify. Tischtschenko, J. Russ. Phys. Chem. 60, 162, used an alkaline sodium carbonate solution and obtained mainly a dichloro derivative of salicylic acid. Lassar-Cohn & Schultze, Ber. 38, 3300 (1905), employed potassium hypochlorite on the dipotassium salt of salicylic acid and obtained a mixture of 5-chlorosalicylic acid and dichlorosalicylic acid. Ullmann & Kopetschnie, Ber. 44, 428 (1911) obtained substantially the same results using the monopotassium salt.

The use of a nitrobenzene slurry has been reported; however, the resulting product is obtained in poor yields and the low melting point of 160–165° C. indicates a very impure material. Other techniques for chlorination of salicylic acid include the use of (1) hydrogen chloride and hydrogen peroxide (C. A. 22, 584 (1928)) but the yields by this method are only 56–66%; (2) iodo benzene dichloride has been used to obtain yields of 89%. The expense of this reagent negatives any advantages accruing from the relatively good yields of such a process (Neu, Ber. 72, 1511 (1939)); (3) antimony pentachloride (Ber. 8, 816 (1875)) and (4) selenium oxychloride (Morgan et al., J. C. S. 1928, 3269) have been reported as chlorinating agents but, again, the resultant yields of 5-chlorosalicylic acid are low and the purity also quite poor.

It is an object of the present invention to prepare 5-chlorosalicylic acid in good yields and of a high degree of purity.

It is a further object of this invention to prepare 5-chlorosalicylic acid by the chlorination thereof in organic solvent.

It is a still further object of this invention to prepare 5-chlorosalicylic acid in excellent yield and of a high degree of purity by a direct chlorination in organic solvent at elevated temperatures.

Other objects will appear as the description proceeds.

It has been discovered that 5-chlorosalicylic acid may be prepared in very high yields and of an excellent degree of purity by conducting the chlorination with chlorine gas in particular solvents for the salicylic acid at temperatures in excess of about 100° C.

It was totally unexpected that any substantial yield of 5-chlorosalicylic acid would be obtained at such elevated temperatures because of the known tendency of chlorine gas at such temperatures to produce various complex products of chlorination. This is borne out by the following quotation from "Unit Processes in Organic Synthesis," 4th edition, McGraw-Hill Book Company, Inc., New York, N. Y., 1952, page 209, relating to the liquid phase chlorination of benzene:

"Higher temperature, however, gives higher yields of polychlorinated benzenes at any chlorination level."

Furthermore, the high degree of purity of the product obtained by the process of this invention was quite unexpected in view of the known strong oxidizing action of chlorine gas at such high temperatures.

It was further unexpected that the particular class of solvents hereinafter described would result in high yields of the desired product attendant with an excellent degree of purity since the use of nitrobenzene under the same conditions as described below with the halogenated solvents in the process of my invention gave poor yields of the order of 65 to 75%. Such low yields are of the order to be expected at elevated temperatures in the range of 100° C. to 150° C.

The compounds which may be employed as solvents for the salicylic acid in the process of this invention are the halogenated, monocyclic, carbocyclic, aromatic compounds of the formula

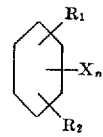

wherein $R_1$ and $R_2$ may be H or lower alkyl such as methyl and ethyl, X is halogen and $n$ is an integer from 1 to 3 inclusive.

The solvent to be operable in this process should have a melting point below room temperature (25–30° C.) and be inert to any substantial chlorination at the temperature at which the chlorination step is carried out. It is of course understood that compounds embraced by the above formula and which are solids at room temperatures (25–30° C.) may be employed provided they are used in admixture with other liquid or normally solid compounds of the type herein contemplated so that the resultant mixture has a melting point below room temperature (25–30° C.). It is further clear that as the selected solvent there may be employed a mixture of solvents. Suitable compounds include:

Chlorobenzene
Bromobenzene
m-Bromochlorbenzene
o-Dichlorobenzene
m-Dichlorobenzene
p-Dichlorobenzene
1,2,4-trichlorobenzene
1,2,3,4-tetrachlorobenzene
Pentachlorobenzene
o-Dibromobenzene
m-Dibromobenzene
o-, m-, and p-Bromotoluene
o-, m-, and p-Chlorotoluene
4-bromo-o-xylene and the like The process is carried out by mixing the salicylic acid and solvent or mixture of solvents and raising the temperature to at least about 100° C. and higher if necessary to obtain complete dissolution of the salicylic acid in the selected solvent. It may be desirable to distill off a small aliquot portion of the solvent to insure substantially anhydrous conditions. This is not necessary, since the yields and reaction are not decreased if any substantial water is present during the chlorination step. Before chlorination is begun, the temperature of the solution of salicylic acid and selected solvent or solvents is adjusted to within the range of about 100° C. to about 150° C. and preferably to about 110° C., and then chlorine gas is slowly passed through the solution. The reaction may be checked for completion by cooling a small sample to room temperature, filtering, washing with a few milliliters of fresh solvent, drying, and determining the melting point and chlorine content thereof. More chlorine may be added if necessary. The time required for the addition of the desired amount of chlorine may vary from 7 to 12 hours. Upon completion of the reaction the entire batch is cooled with stirring to room temperature (25–30° C.), filtered, washed several times with fresh solvent and finally dried.

The temperature at which the chlorination reaction is conducted may range from above about 100° C. to about 150° C. and preferably is about 110° C. Slightly higher temperatures may be employed, but are usually not necessary or desirable since better yields and/or purity of product are generally not forthcoming, and there may be, additionally, side reactions complicating the process which would lead to decreased yields of and impurities in the final product.

The following examples will serve to illustrate the present invention without being deemed limitative thereof.

Example 1

To 3265 g. chlorobenzene is added 600 g. salicylic acid. 100 mls. chlorobenzene are distilled off to insure dryness during the course of the subsequent chlorination reaction. The mixture is cooled to 110° C., at which temperature there results a clear solution of the salicylic acid in the chlorobenzene. 310 g. chlorine gas are slowly passed into this solution over a period of 10½ hours. Upon the completion of the passage of the chlorine gas, the reaction mass is cooled with stirring to 25–30° C. and filtered with suction. The filter cake is washed with 3 portions of 200 mls. each of fresh chlorobenzene and then dried. The yield is 695.2 g. corresponding to 92.7% of theory. The product has the following physical characteristics: Melting point 168.7 to 173.0° C. Chlorine content 20.53%.

Example 2

The procedure of Example 1 is repeated except that the chlorine gas is passed through the solution over a period of 12 hours. The resultant yield of 703.8 g. amounting to 93.8% of theory had a melting point of 168.2–172.8° C. and a chlorine content of 20.72%.

Example 3

The procedure of Example 1 is repeated employing o-chlorotoluene as the solvent. The yield is 710 g. (94.6% of theory), and has a melting point of 172–173° C.

Example 4

The procedure of Example 1 is repeated using bromobenzene as the solvent. The yield is 700 g. (93.3% of theory) and has a melting point of 172.4–173.0° C.

Example 5

The procedure of Example 1 is repeated using m-chlorotoluene as the solvent. The yield is 705 g. (94.0% of theory) and has a melting point of 171–172° C.

Example 6

The procedure of Example 5 is repeated except that the chlorine gas is added over a period of 7 hours. The yield is 701 g. (93.5%) and has a melting point of 172–172.6° C.

Example 7

The procedure of Example 6 is repeated using 1,2,4-trichlorobenzene as the solvent. The yield is 700 g. (93.3% of theory) and has a melting point of 171.6–172.5° C.

Variations and modifications which will be obvious and apparent to those skilled in the art may be made in the procedures above described without departing from the scope and spirit of my invention.

I claim:

1. A process for the preparation of 5-chlorosalicyclic acid comprising chlorinating salicyclic acid dissolved in a halogenated, monocyclic, carbocyclic, aromatic solvent wherein the halogen is selected from the group consisting of chlorine and bromine with chlorine at a temperature of from about 100° C. to about 150° C.

2. A process for the preparation of 5-chlorosalicyclic acid comprising chlorinating salicylic acid dissolved in a halogenated, monocyclic, carbocyclic, aromatic solvent wherein the halogen is selected from the group consisting of chlorine and bromine with chlorine at a temperature of 110° C.

3. A process for the preparation of 5-chlorosalicyclic acid comprising chlorinating salicyclic acid dissolved in a solvent having the formula

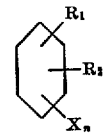

wherein $R_1$ and $R_2$ are selected from the group consisting of hydrogen and lower alkyl radicals, X is selected from the group consisting of chlorine and bromine and $n$ is an integer of from 1 to 5 with chlorine at a temperature of from about 100° C. to about 150° C.

4. A process for the preparation of 5-chlorosalicylic acid comprising chlorinating salicylic acid dissolved in a solvent having the formula

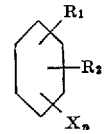

wherein $R_1$ and $R_2$ are selected from the group consisting of hydrogen and lower alkyl radicals, X is selected from the group consisting of chlorine and bromine, and $n$ is an integer of from 1 to 5 with chlorine at a temperature of 110° C.

5. A process for the preparation of 5-chlorosalicylic acid comprising chlorinating salicylic acid dissolved in chlorobenzene with chlorine at a temperature from about 100° C. to about 150° C.

6. A process for the preparation of 5-chlorosalicylic acid comprising chlorinating salicyclic acid dissolved in a dichlorobenzene with chlorine at a temperature from about 100° C. to about 150° C.

7. A process for the preparation of 5-chlorosalicylic acid comprising chlorinating salicylic acid dissolved in 1,2,4-trichlorobenzene with chlorine at a temperature from about 100° C. to about 150° C.

8. A process for the preparation of 5-chlorosalicylic acid comprising chlorinating salicylic acid dissolved in bromobenzene with chlorine at a temperature from about 100° C. to about 150° C.

9. A process for the preparation of 5-chlorosalicylic acid comprising chlorinating salicylic acid dissolved in m-chlorotoluene with chlorine at a temperature from about 100° C. to about 150° C.

10. A process for the preparation of 5-chlorosalicylic acid from salicylic acid, the improvement which comprises passing chlorine gas over a period of about at least 10 hours through a solution of salicylic acid in a halogenated monocyclic carbocyclic aromatic solvent wherein the halogen is selected from the group consisting of chlorine and bromine at a temperature from about 100° C. to about 150° C. and then cooling to about room temperature to precipitate the resulting 5-chlorosalicylic acid.

11. A process as defined in claim 10 wherein the solvent is chlorobenzene and the temperature of reaction is 110° C.

12. A process as defined in claim 10 wherein the solvent is a dichlorobenzene and the temperature of reaction is 110° C.

13. A process as defined in claim 10 wherein the solvent is bromobenzene and the temperature of reaction is 110° C.

References Cited in the file of this patent

FOREIGN PATENTS 607,113   Great Britain _____ Aug. 25, 1948

OTHER REFERENCES

Plazek Chem. Absts. 25, pp. 1504–5 (1931).
Hirwe et al.: Chem. Absts. 33, p. 2124 (1939).
Neu, Ber. Deut. Chem. 72, p. 1511 (1939).

U. S. DEPARTMENT OF COMMERCE
PATENT OFFICE

CERTIFICATE OF CORRECTION

Patent No. 2,811,547                          October 29, 1957

Arthur E. Brown

It is hereby certified that error appears in the printed specification of the above numbered patent requiring correction and that the said Letters Patent should read as corrected below.

Column 2, line 5, in the equation, under the arrow, for "$H_3PH_4$" read -- $H_3PO_4$ --; in the structural formula to the right of the arrow, the upper central carbon atom designated as "C" should be an oxygen atom and designated as an -- O --.

Signed and sealed this 25th day of February 1958.

(SEAL)
Attest:

KARL H. AXLINE
Attesting Officer

ROBERT C. WATSON
Commissioner of Patents